Figure 1:
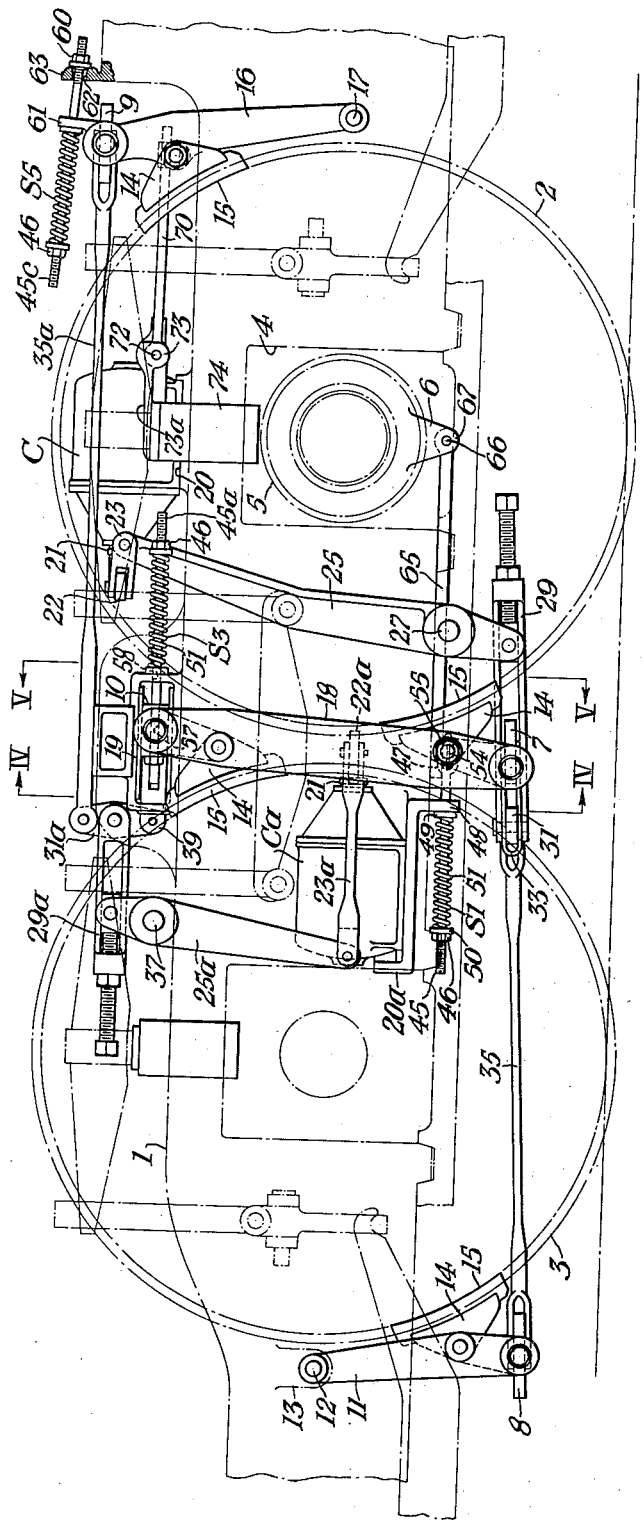

May 13, 1941.   E. G. MUELLER   2,242,015
BRAKE MECHANISM
Filed March 29, 1940   4 Sheets-Sheet 2

INVENTOR
Emil G. Mueller.
BY
HIS ATTORNEY

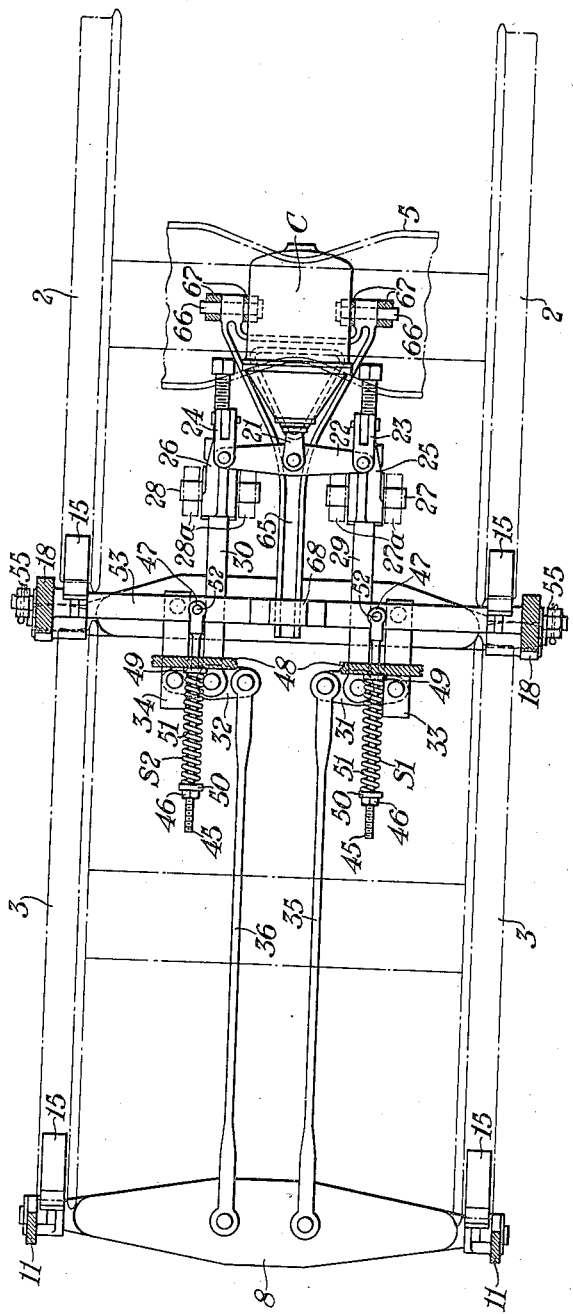

May 13, 1941.  E. G. MUELLER  2,242,015
BRAKE MECHANISM
Filed March 29, 1940  4 Sheets-Sheet 4

INVENTOR
Emil G. Mueller.
BY
HIS ATTORNEY

Patented May 13, 1941

2,242,015

UNITED STATES PATENT OFFICE 2,242,015

BRAKE MECHANISM

Emil G. Mueller, Swissvale, Pa., assignor to The American Brake Company, Swissvale, Pa., a corporation of Missouri Application March 29, 1940, Serial No. 326,710

2 Claims. (Cl. 188—46)

My invention relates to brake mechanism, and particularly to brake mechanism for applying clasp brakes to the driving wheels of locomotives.

In at least one form of modern high speed locomotive, the locomotive is provided with four pairs of driving wheels the first and second pairs of which are driven from one set of cylinders, and the third and fourth pairs of which are driven from another set of cylinders. All four pairs of driving wheels are mounted in a rigid frame, and in order to keep the overall length of the locomotive to a minimum to facilitate the negotiation of curves by the locomotive the adjacent wheels of the first and second pairs of drivers, and also the adjacent wheels of the third and fourth pairs, are located as closely together as the necessary clearances between the wheels themselves will permit. Furthermore, in order to facilitate the ability of the driving wheels to freely follow the track rails on curves or uneven stretches of track, the first and third pairs of driving wheels are arranged for a limited amount of lateral movement with respect to the locomotive frame.

When the driving wheels of a locomotive are located closely together in the manner just described, there is, of course, no room for mounting any part of the brake mechanism directly between the wheel centers, and the available space between the wheels above their centers is frequently limited by the valve gear or other parts of the locomotive, while the space between the wheels below their centers is limited by the diameters of the wheels and the necessary track clearances which must be provided. As a result, if the driving wheels have relatively small diameters, the only way in which clasp brakes can be applied to the wheels is to place the brake shoe on one side of each wheel some distance below the plane passing through the wheel center, and the brake shoe on the other side of each wheel some distance above the plane passing through the wheel center. With this arrangement there will be two brake shoes between each two adjacent closely spaced wheels on the same side of the locomotive, and these two shoes will be oppositely disposed and will cooperate with different wheels, thus making it difficult to provide a satisfactory mechanism for properly supporting and operating the brake shoes.

One object of my invention is to provide an improved mechanism which makes it possible to satisfactorily support and operate brake shoes arranged as above described on a locomotive of the type described.

Another object of my invention is to provide means for maintaining those brake shoes which are associated with the wheels which are permitted to move laterally in lateral alignment with the wheel rims to insure efficient braking on these wheels and to avoid undue wear on the brake rigging.

A further object of my invention is to provide brake mechanism which can be satisfactorily mounted within the limited space available for the brake rigging on a locomotive of the type described without interference from or with the other parts of the locomotive.

According to my invention, I provide one set of brake mechanism for the first and second pairs of driving wheels, and a similar set for the third and fourth pairs of driving wheels. In each set the two brake shoes which are disposed between the adjacent closely spaced wheels are secured some distance above and below, respectively, the plane passing through the wheel centers to inwardly offset arms formed on the opposite ends of a vertically disposed supporting lever the main part of which is located outside of the plane of the wheels. The two supporting levers disposed at the opposite sides of the locomotive, in turn, are pivotally supported at their upper ends on the opposite ends of a horizontally disposed brake beam which is slidably supported adjacent its ends by means of brackets rigidly attached to the locomotive frame, and these supporting levers are connected together at their lower ends by another brake beam which is supported entirely by the levers. The brake shoes of each set at the rear sides of the rear pair of closely spaced wheels are supported by hanger levers which are connected together at their lower ends by means of a brake beam, and the brake shoes of each set at the forward sides of the forward pair of closely spaced wheels are supported by upstanding supporting levers the upper ends of which are connected together by another brake beam. The two upper brake beams of each set of brake mechanism are each actuated by a first brake cylinder through a first set of interconnected rods or levers, while the two lower brake beams are similarly actuated by a second brake cylinder through the medium of a second set of interconnected rods of levers similar to the first set. Associated with each of the supporting levers are suitable spring means for moving the levers, when the brakes are released, to positions in which the brake shoes are held clear of the wheels. The two upstanding supporting levers of each set are also connected by a tie rod at the points where the brake shoes are attached thereto, and this tie rod in turn is operatively connected by an arm with the spring staples. These spring staples move laterally in response to lateral movements of the wheels, and this movement is transmitted through the arm and the tie rod to the brake shoes to cause the brake shoes to follow the lateral movements of the wheels. Means are also provided for causing the lower ends of the levers which support the brake shoes disposed between the closely spaced wheels to follow the lateral movements of the laterally movable wheels, whereby the lower brake shoes disposed between the laterally movable wheels are caused to follow the lateral movements of these wheels.

Other objects and characteristic features of my invention will become apparent as the description proceeds.

The brake mechanism embodying my invention is an improvement upon that disclosed and claimed in Letters Patent of the United States No. 2,147,871, granted to F. G. Williamson on February 21, 1939, and also that described and claimed in Letters Patent of the United States No. 2,134,789, granted to H. A. Hoke on November 1, 1939.

The means embodying my invention for causing the brake shoes to follow the lateral movement of the wheels is an improvement upon that disclosed and claimed in the copending application for Letters Patent of the United States Serial No. 247,253, filed by T. C. Crossman on December 22, 1938, for Brake rigging, Patent No. 2,199,128, April 30, 1940, and also upon that disclosed and claimed in the copending application for Letters Patent of the United States Serial No. 248,652 filed by myself on December 31, 1938, for Brake rigging.

I shall describe one form of brake mechanism embodying my invention, and shall then point out the novel features thereof in claims.

Figure 2:
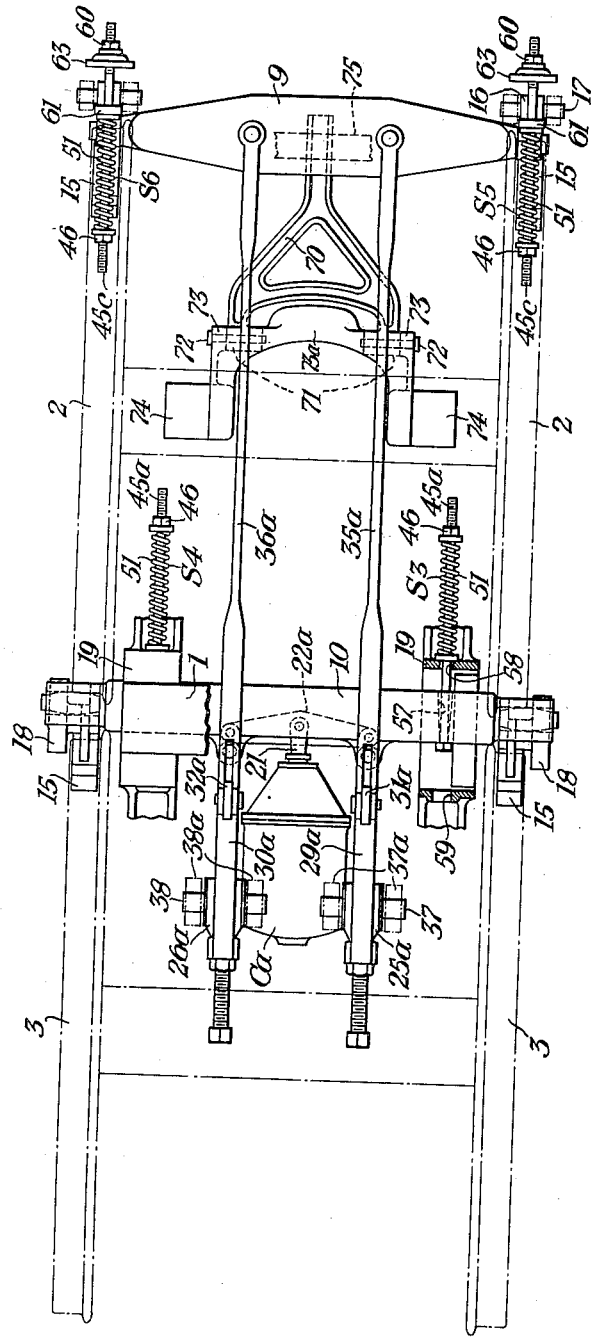
Figure 6:
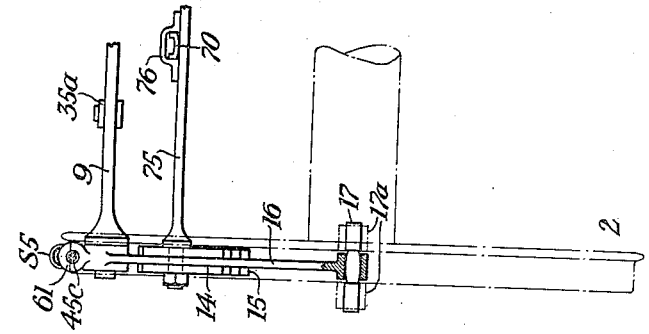
Figure 5:
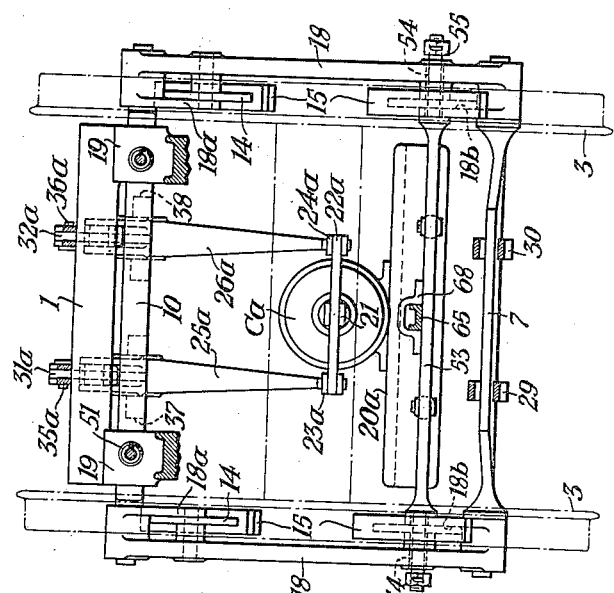
Figure 4:
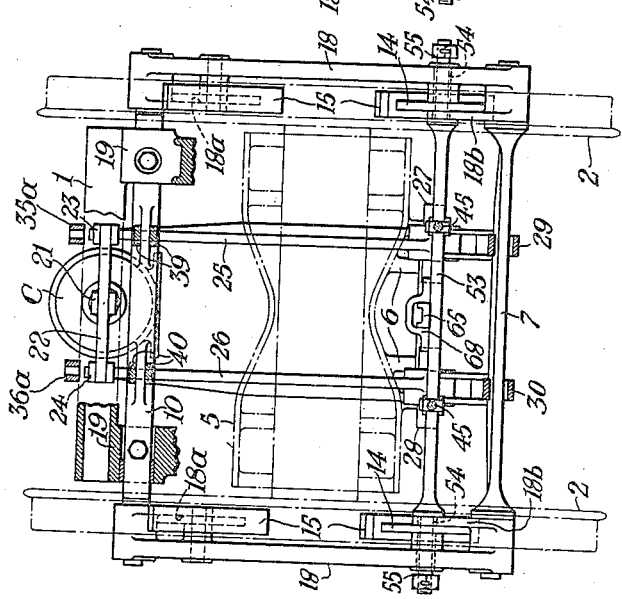

In the accompanying drawings, Fig. 1 is a side elevational view of the first and second pairs only of driving wheels of a locomotive of the type described having applied thereto brake mechanism embodying my invention. Figs. 2 and 3 are top plan views illustrating different portions of the brake mechanism shown in Fig. 1, certain of the parts being omitted for the sake of clearness. Figs. 4 and 5 are sectional views taken substantially on the lines IV—IV and V—V, respectively, of Fig. 1. Fig. 6 is a right-hand end view of a portion of the apparatus illustrated in Fig. 1.

Similar reference characters refer to similar parts in each of the several views.

Referring to the drawings, the locomotive to which I have shown my invention applied is of the type having four pairs of driving wheels, the first and second pairs of which are driven from a first set of steam cylinders and the third and fourth pairs of which are driven from a second set of steam cylinders. All four pairs of driving wheels are mounted in a rigid frame 1, only the first and second pairs 2 and 3 of driving wheels being illustrated in the drawings since the brake mechanism for the other two pairs is identical for all practical purposes with that for the first and second pairs.

Each pair of driving wheels is mounted on an axle comprising a part of a roller bearing axle assembly, the construction of which forms no part of my present invention, and is therefore not shown in detail in the drawings. It should be particularly pointed out, however, that the axle assembly for the front pair of driving wheels 2 is suitably journaled at each end in a journal box (not shown) which is guided by spaced pedestal jaws 4 formed in the side member of the frame in such manner that the journal box is free to slide vertically and laterally with respect to the frame, and each axle assembly includes a member 5 (see Figs. 1, 3 and 4) which connects the two journal boxes and is movable laterally therewith. This member may assume a variety of forms depending upon the particular type of roller bearing construction employed, and is here shown as being tubular in construction. This member is referred to in the art by a variety of different designations, but for convenience I shall hereinafter refer to it as an axle housing, although it should be distinctly understood that insofar as my present invention is concerned its exact construction is immaterial so long as it is a non-rotatable member which moves laterally in response to lateral movement of the associated driving wheels. The member 5 is provided at its center with a depending bracket 6 for a purpose which will appear presently. It should be noted that the wheel and axle assembly just described is free to move laterally through a distance sufficient to permit the wheels to freely follow the track rails on curves without causing undue side thrust of the flanges of one or the other of the wheels on the adjacent rails, this distance in actual practice usually being about ⅞ inch in either direction from the normal central position.

The wheel and axle assembly for the second pair of driving wheels 3 is of the usual construction, and is not adapted to move any appreciable distance laterally with respect to the truck frame. Due to the usual operating clearances, this wheel and axle assembly may at times be moved laterally with respect to the truck frame, but such movement will be so slight that the assembly will at no time strain the brake rigging or interfere with its operation. That is to say, insofar as my present invention is concerned, this latter wheel and axle assembly may be considered as fixed against lateral movement.

It will be observed that the driving wheels 2 and 3 are closely spaced, the distance between the wheels preferably being no greater than the necessary clearances between the wheels themselves will permit. The reason for closely spacing the wheels in this manner is to decrease the overall length of the locomotive to a minimum to facilitate its ability to negotiate curves.

Extending transversely of the wheels 2 and 3 considerably below the horizontal plane passing through their centers are brake beams 7 and 8, and extending transversely of the wheels 2 and 3 considerably above the horizontal plane passing through their centers are other brake beams 9 and 10, the brake beam 10 being disposed directly above the brake beam 7.

The brake beam 8 is supported for movement toward and away from the wheels 3 between brake applying and brake releasing positions by means of a pair of hanger levers 11, the upper ends of which are pivotally secured to the locomotive frame by means of pins 12 mounted in suitable bifurcated supports 13, and the lower ends of which are pivotally connected with the opposite ends of the brake beam. Secured to each of the levers 11 intermediate its ends is a brake head 14 carrying a brake shoe 15 which when the brake beam is moved to its brake applying position is adapted to engage the associated wheel 3 in a zone located some distance below the horizontal plane passing through the axis of the wheel.

The brake beam 9 is supported for movement toward and away from the wheels 2 between brake applying and brake releasing positions by means of a pair of upstanding supporting levers 16 which are somewhat similar to the hanger levers 11, but which are disposed oppositely from the hanger levers 11. Each supporting lever 16 is pivoted at its lower end on a pin 17 mounted in spaced lugs 17a (see Fig. 6) provided on the engine frame, and has pivotally secured thereto intermediate its ends a brake shoe 15 which, when the brake beam 9 is moved toward the left to its brake applying position, is adapted to engage the associated wheel 2 in a zone located some distance above the horizontal plane passing through the axes of the wheels.

As was pointed out hereinbefore, the wheels 2 are free to move laterally through a considerable distance, and in order to permit the necessary lateral rocking movement of the supporting levers 16 to enable the brake shoes to freely follow the lateral movements of the wheels 2, the portion of each pin 17 on which the associated supporting lever is pivoted is made barrel shaped, as best seen in Fig. 6.

The brake beam 7 is supported for swinging movement toward and away from the wheel 2 between brake applying and brake releasing positions by means of a pair of levers 18. These latter levers are pivotally connected at their lower ends to the opposite ends of the brake beam 7, and are pivotally mounted at their upper ends on the opposite ends of the brake beam 10. The brake beam 10, in turn, is slidably supported adjacent its ends for movement toward and away from the wheels 3 between brake applying and brake releasing positions by means of supporting brackets 19 rigidly attached to the frame 1.

As best seen in Figs. 1, 3, 4 and 5, the central portion of each lever 18 is disposed outside of the plane of the associated wheels, but the upper and lower end portions are provided with inwardly offset arms 18a and 18b which are disposed within the plane of the wheels, and which carry brake heads 14 provided with brake shoes 15. The upper brake shoe 15 is adapted when the brake beam 10 is moved to its brake applying position to engage the adjacent wheel 3 in a zone which is substantially diametrically opposite to the zone at which the brake shoe 15 secured to the lever 11 is adapted to engage this wheel, while the lower brake shoe 15 is adapted, when the brake beam 7 is moved to its brake applying position, to engage the adjacent wheel 2 in a zone which is located substantially diametrically opposite to the zone at which the brake shoe 15 secured to the lever 16 is adapted to engage this wheel.

It should be pointed out that sufficient clearance is provided between the levers 18 and their points of connection with the brake beams 7 and 10 to permit the lower ends of the levers 18 to swing laterally through a sufficient arc to enable the lower brake shoes 15 carried by the levers 18 to freely follow the lateral movements of the wheels 2.

The brake mechanism also includes two substantially similar sets of interconnected rods and levers, one for actuating the two lower brake beams 7 and 8 between their brake applying and brake releasing positions, and the other for actuating the two upper brake beams 9 and 10 between their brake applying and brake releasing positions.

Referring first to the set of interconnected rods and levers for actuating the brake beams 7 and 8, this set is operated by a brake cylinder C disposed between the wheels 2 directly above the axle connecting these wheels. The brake cylinder C is secured to a suitable support 20 provided on the engine frame, and includes the usual cylinder body, reciprocable piston (not shown) biased to the inner end of its stroke by the usual release spring (not shown), and a push rod 21 which is operatively connected with the piston.

The push rod 21 is operatively connected at its outer end with a main equalizing lever 22 intermediate its ends, and the main equalizing lever, in turn, is operatively connected at its ends through the medium of double jaws 23 and 24 with the upper ends of two similar laterally spaced vertically extending brake cylinder levers 25 and 26. The brake cylinder levers 25 and 26 are pivotally supported intermediate their ends on spaced pivot pins 27 and 28 mounted in spaced lugs 27a and 28a provided on the engine frame, and are operatively connected at their lower ends, through the medium of links 29 and 30 with auxiliary equalizing levers 31 and 32 intermediate their ends. The links 29 and 30 include slack adjusters of the usual and well-known construction, and since these slack adjusters are of the usual and well-known construction, they need not be described in detail herein. It will be noted that each of the links at the end which is connected with the associated equalizing lever straddles the brake beam 7.

The equalizing levers 31 and 32 are horizontally disposed and are located at one side of the brake beam 7 adjacent the opposite ends thereof in substantially the same horizontal plane as the brake beam. The outer ends of these equalizing levers are pivotally connected to strap links 33 and 34 which are pivotally secured to the brake beam 7 at points equally spaced from the ends of this brake beam, while the inner ends of these equalizing levers are operatively connected through the medium of pull rods 35 and 36 with the brake beam 8 at points equally spaced from its ends.

The other set of interconnected rods and levers is actuated by a brake cylinder Ca which is similar to the brake cylinder C, and which is disposed between the wheels 3 in front of the axle connecting these wheels. This latter brake cylinder is secured to a suitable support 20a provided on the engine frame.

The push rod 21 of the brake cylinder Ca is operatively connected at its outer end with a main equalizing lever 22a, the opposite ends of which are connected by means of pull rods 23a and 24a with the lower ends of vertically disposed brake cylinder levers 25a and 26a. The brake cylinder levers 25a and 26a, in turn, are pivoted intermediate their ends on pivot pins 37 and 38 mounted in spaced lugs 37a and 38a provided on the engine frame, and are operatively connected at their upper ends with auxiliary equalizing levers 31a and 32a intermediate their ends through the medium of links 29a and 30a similar to the links 29 and 30.

The auxiliary equalizing levers 31a and 32a are vertically disposed, and are operatively connected at their lower ends through the medium of double jaws 39 and 40 with the brake beam 10 at points equally spaced from its ends. The upper ends of the auxiliary equalizing levers 31a and 32a are operatively connected by means of pull rods 35a and 36a with the brake beam 9 at points equally spaced from its ends.

When it is desired to apply the brakes, fluid pressure is simultaneously supplied to the two brake cylinders C and Ca which causes the associated push rods 21 to move outwardly in the cylinders in opposition to the bias of the release springs. The outward movement of the push rod 21 of the brake cylinder C acts through the associated set of interconnected rods and levers to move the brake beams 7 and 8 to their brake applying positions, while the outward movement of the push rod 21 of the brake cylinder Ca similarly acts through the associated set of interconnected rods and levers to simultaneously move the brake beams 9 and 10 to their brake applying positions. The movement of the brake beam 8 to its brake applying position causes the associated hanger lever 11 to rotate in a counter-clockwise direction, and hence causes the brake shoes 15 secured to these levers to frictionally engage the wheels 3. The movement of the brake beams 7 and 10 to their brake applying positions causes the lower ends of the levers 18 to move toward the right and the upper end of these levers to move toward the left, in substantially the same manner as if these levers were pivoted at points midway between their ends, and thereby causes the upper brake shoes 15 carried by these levers to frictionally engage the wheels 3 and the lower brake shoes carried by these levers to frictionally engage the wheels 2.

The movement of the brake beam 9 to its brake applying position causes the levers 16 to rotate in a counter-clockwise direction to the positions in which the associated brake shoes 15 frictionally engage the wheels 2.

It will be seen, therefore, that when the brakes are applied, each wheel will be clasped between a pair of diametrically opposite shoes, and the parts are so proportioned that the braking forces exerted by the shoes will all be approximately equal.

When the fluid supplied to the brake cylinders of the brake mechanism is subsequently vented to atmosphere, the release springs in the brake cylinders will restore the push rods to their retracted positions, which movement removes the forces tending to press the brake shoes against the wheels, whereupon the brake beam 8 will swing by gravity to its brake releasing position in which the brake shoe 15 secured to the lever 11 will be out of engagement with the wheels 3. However, the frictional force which exists between the brake beam 10 and the associated supports opposes the movement of this brake beam to its brake releasing position, and the force of gravity opposes the movement of the brake beams 7 and 9 to their brake releasing positions, and since there is usually a certain amount of unavoidable lost motion between the interconnected rods and levers which actuate the brake beams, the brake shoes attached to the levers 16 and 18 will have a tendency to drag.

It is desirable to prevent any of the brake shoes from dragging when the brakes are released, and to this end I provide auxiliary spring means which I shall now describe for restoring the brake beams 7, 9 and 10 to their brake releasing positions.

Referring first to the auxiliary spring means for moving the brake beam 7 to its brake releasing position following a brake application, these spring means comprise two similar spring units S1 and S2 (see Fig. 3), each consisting of a spring rod 45 one end of which is threaded to receive an adjusting nut 46 and the other end of which is provided with a jaw 47. The rods 45 are slidably supported intermediate their ends in laterally spaced depending lugs 48 provided on the engine frame, and surrounding each rod between a cupped washer 49 which abuts against the associated lug 48 and another cupped washer 50 which abuts against the adjusting nut 46 is a compressed coil spring 51 which biases the spring rod toward the left to a position which depends upon the adjustment of the nut.

The spring rods 45 at the ends which are provided with the jaws 47 are attached by means of pins 52 passing through the jaws with a tie bar 53 at points equally spaced from its ends. The tie bar 53 (see Fig. 4) extends transversely of the engine frame below the plane passing through the wheel centers, and is provided at its ends with rounded portions 54 which pass through the arms 18b of the lever 18 and through the associated brake heads 14 and serves as a means for attaching the brake heads to the arms 18b. Each rounded portion is threaded at its outer end for the reception of a nut 55 which fastens the tie bar to the adjacent lever, whereby the levers 18 and the tie bar are constrained to move as a unit. The nut 46 of each spring unit S1 and S2 is so adjusted that when the brake cylinder C is vented to atmosphere, as will be the case when the brakes are released, the spring units S1 and S2 will act through the tie bar 53 and the levers 18 to move the brake beam 7 to its brake releasing position in which the lower brake shoes 14 attached to the lever 18 will be held clear of the wheels 2.

The spring means for moving the brake beam 10 to its brake releasing position comprises two spring units S3 and S4 (best shown in Fig. 2). These spring units are similar to the previously described spring units S1 and S2 except for the spring rods 45a which, instead of being provided with jaws, are provided with heads. The rods 45a extend at their headed ends through tapered horizontal openings 57 provided in the brake beam 10 and are slidably supported intermediate their ends in aligned openings 58 formed in the side walls of the brackets 19 which support the brake beam 10. To permit ready insertion of the rods 45 into the openings 57 and 58, an opening 59 is formed in the side wall of the bracket 19 opposite the opening 58, this latter opening being sufficiently large to clear the heads of the rods. The nuts 46 of the spring units S3 and S4 are so adjusted that when the brake cylinder Ca is vented to atmosphere, as will be the case when the brakes are released, the spring units S3 and S4 will exert sufficient force on the brake beam 10 to move it to its brake releasing position in which the upper brake shoes 14 attached to the levers 18 will be held clear of the wheels 2.

The spring means for moving the brake beam 9 to its brake releasing position comprises two spring units S5 and S6. These latter spring units are likewise similar to the units S1 and S2 except for the spring rods 45c which, as here shown, are threaded at their right-hand ends for the reception of a nut 60. The spring rods 45c are slidably supported intermediate their ends in upstanding lugs 61 provided on the upper ends of the levers 16, and extend at their right-hand ends through clearance holes 62 provided in upstanding supports 63 formed on the engine frame. The adjusting nuts 46 of these latter units are so adjusted that when the brake cylinder Ca is vented to atmosphere, the spring units S5 and S6 will exert sufficient force on the levers 16 to move the brake beam 9 to its brake releasing position in opposition to the bias of gravity.

With the spring means constructed in the manner just described, it will be apparent that when the brakes are released, all of the brake beams will be moved to their brake releasing positions to thereby prevent the brake shoes from dragging.

As was pointed out hereinbefore, brake mechanism embodying my invention also includes means for maintaining the brake shoes 15 which cooperate with the laterally movable wheels 2 in lateral alignment with these wheels. Referring first to the means for maintaining the two lower brake shoes 15 attached to the levers 18 in lateral alignment with the wheels 2, these means comprise a rigid arm 65 (see Fig. 3) which is pivotally attached at one end by means of pivot pins 66 passing through spaced lugs 67 to the previously described bracket 6, and which extends at the other end into an opening formed between the tie bar 53 and an inverted U-shaped bracket or stirrup 68 which is welded or otherwise secured to the tie bar 53.

It will be remembered that the housing to which the bracket 6 is attached is constrained to follow the lateral movements of the wheels 2 and that sufficient clearance is provided between the levers 18 and their points of connection with the brake beams 7 and 10 to permit the levers 18 to swing laterally through a sufficient arc to enable the lower brake shoes 15 to freely follow the lateral movements of the wheels. It will be seen, therefore, that when lateral movements of the wheels 2 take place, these movements will be transmitted to the brake shoes through the medium of the bracket 6, the pins 66, the arm 65 and the tie bar 53, whereby the brake shoes will remain at all times in lateral alignment with the wheels. It should be noted that the spring units S1 and S2 will not interfere with this lateral movement due to the clearances which are provided between the spring bolts 45 and the openings in the supports 48, and also the fact that the spring bolts are pivotally attached to the tie bar 53.

Referring next to the means for causing the brake shoes 15 attached to the supporting levers 16 to follow the lateral movements of the wheels, these means comprise a rigid arm 70, one end of which is provided with laterally spaced lugs 71 which are pivotally attached by means of pivot pins 72 to laterally spaced lugs 73 formed on a bracket 73a welded or otherwise secured to the spring staples 74 at the opposite sides of the locomotive. The free end of the arm 70 is secured to a tie bar 75 similar to the tie bar 53, which tie bar connects the levers 16 together and also serves as a means for operatively connecting the brake heads 14 which support the brake shoes 15, with the levers 16. The arm 70 is connected with the tie bar 75 by means of a stirrup 76 similar to the stirrup 68.

The spring staples 74 are constrained to move laterally with the wheels, and it will be seen that any lateral movement of these spring staples will be transmitted through the lugs 71, pins 72, arm 70, stirrup 76 and tie bar 75 to the brake heads 14 mounted thereon, with the result that the brake shoes 15 secured to the levers 16 will be constrained to follow the lateral movement of the wheels 2.

It should be noted that sufficient clearance is provided between the spring bolts 45c of the spring units S5 and S6 and the openings in the lugs 61, and also between the bolts 45c and the opening 62 in the supports 63 to permit the necessary lateral movement of the upper ends of the arms 16.

Although I have herein shown and described only one form of brake mechanism embodying my invention, it is understood that various changes and modifications may be made therein within the scope of the appended claims without departing from the spirit and scope of my invention.

Having thus described my invention, what I claim is:

1. In a brake mechanism for vehicles having a frame supported by at least two closely spaced wheel and axle assemblies one of which is arranged for lateral movement with respect to said frame, a first brake beam slidably supported between said wheel and axle assemblies some distance above their axes for movement between brake applying and brake releasing positions, two levers pivotally supported at their upper ends on the opposite ends of said first brake beam and disposed outside of the plane of the wheels at their contiguous portions, a second brake beam supported by the lower ends of said levers and movable in directions opposite to said first beam between brake applying and brake releasing positions, a tie rod connecting said levers adjacent their lower ends, brake heads carrying brake shoes for cooperation with the wheels of the laterally movable wheel and axle assembly secured to said levers by means of said tie rod, said levers being free to move laterally at their lower ends through a sufficient distance to permit said shoes to follow the lateral movements of the wheels of said laterally movable wheel and axle assembly, other shoes secured to said levers adjacent their upper ends for cooperation with the wheels of the other closely spaced wheel and axle assembly, separate means connected with said brake beams for moving them between their brake applying and brake releasing positions, and means for moving said tie bar laterally in response to lateral movements of said laterally movable wheel and axle assembly for causing the brake shoes which cooperate with the laterally movable wheels thereof to remain at all times in lateral alignment with the wheels.

2. In a brake mechanism for vehicles having a frame supported by at least two closely spaced wheel and axle assemblies one of which is arranged for lateral movement with respect to said frame, a first brake beam slidably supported between said wheel and axle assemblies some distance above their axes for movement between brake applying and brake releasing positions, two levers pivotally supported at their upper ends on the opposite ends of said first brake beam and disposed outside of the plane of the wheels at their contiguous portions, a second brake beam supported by the lower ends of said levers and movable in directions opposite to said first beam between brake applying and brake releasing positions, a tie rod connecting said levers adjacent their lower ends, brake heads carrying brake shoes for cooperation with the wheels of the laterally movable wheel and axle assembly secured to said levers by means of said tie rod, said levers being free to move laterally at their lower ends through a sufficient distance to permit said shoes to follow the lateral movements of the wheels of said laterally movable wheel and axle assembly, other shoes secured to said levers adjacent their upper ends for cooperation with the wheels of the other closely spaced wheel and axle assembly, separate power means for moving said brake beams to their brake applying positions, spring means for moving said brake beams to their brake releasing positions independently of said power means, and means for moving said tie bar laterally in response to lateral movements of said laterally movable wheel and axle assembly for causing the brake shoes which cooperate with the laterally movable wheels thereof to remain at all times in lateral alignment with the wheels.

EMIL G. MUELLER.